(12) United States Patent
Hibst et al.

(10) Patent No.: US 8,808,575 B2
(45) Date of Patent: *Aug. 19, 2014

(54) PROCESS FOR THE PREPARATION OF POROUS CRYSTALLINE LITHIUM-, VANADIUM AND PHOSPHATE-COMPRISING MATERIALS

(71) Applicant: BASF SE, Ludwigshafen (DE)

(72) Inventors: Hartmut Hibst, Schriesheim (DE); Brian Roberts, South Euclid, OH (US); Jordan Keith Lampert, Ludwigshafen (DE); Kirill Bramnik, Jersey City, NJ (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,996

(22) Filed: Apr. 2, 2013

(65) Prior Publication Data

US 2013/0214212 A1 Aug. 22, 2013

Related U.S. Application Data

(62) Division of application No. 12/681,193, filed as application No. PCT/EP2008/062427 on Sep. 18, 2008, now abandoned.

(60) Provisional application No. 60/976,640, filed on Oct. 1, 2007, provisional application No. 61/024,631, filed on Jan. 30, 2008.

(51) Int. Cl.
*H01M 4/88* (2006.01)
*H01M 4/58* (2010.01)

(52) U.S. Cl.
USPC ........ 252/182.1; 252/506; 252/507; 252/508; 252/519.12; 429/231.5; 429/231.95

(58) Field of Classification Search
USPC ......... 252/182.1, 506, 507, 508, 509, 519.12; 429/231.5, 231.95
See application file for complete search history.

(56) References Cited

U.S. PATENT DOCUMENTS

| 4,567,158 A | 1/1986 | Wrobleski et al. |
| 5,102,836 A | 4/1992 | Brown et al. |
| 5,871,866 A | 2/1999 | Barker et al. |
| 5,910,382 A | 6/1999 | Goodenough et al. |
| 6,203,946 B1 | 3/2001 | Barker et al. |
| 6,528,033 B1 | 3/2003 | Barker et al. |
| 2011/0037032 A1 | 2/2011 | Hibst et al. |
| 2012/0012797 A1 | 1/2012 | Bramnik et al. |

FOREIGN PATENT DOCUMENTS

| EP | 1 403 945 | 3/2004 |
| WO | 2004/082047 | 9/2004 |
| WO | 2006/116251 | 11/2006 |
| WO | 2008/060701 | 5/2008 |

OTHER PUBLICATIONS

A Novel Cathode Material Lithium Vanadium Phosphate Synthesized by Liquid-phase Sphericizing Granulation, Hou et al., Acta Phys. Chim. Sin, vol. 23, No. 12, pp. 1954-1957 (2007).*
Hou, et al., "A Novel Cathode Material Lithium Vanadium Phosphate Synthesized by Liquid-phase Sphericizing Granulation", Acta Phys. Chim. Sin., vol. 23, No. 12, pp. 1954-1957 (2007).
S. Patoux, et al., "A Comparative Structural And Electrochemical Study of Monoclinic $Li_3Fe_2 (PO_4)_3$ And $Li_3V_2 (PO_4)_3$", Journal of Powder Sources, vol. 119-121, pp. 278-284 (Jun. 1, 2003) XP002540144.
C. Wurm, et al., "Lithium Insertion/Extraction Into/From $LIMX_2O_7$ Compositions (M=Fe, V; X=P, As) Prepared Via a Solution Method", Chem. Mater., vol. 14, No. 6, pp. 2701-2710 (2002).
Taiwanese Search Report issued Apr. 19, 2012, in Patent Application No. 097136971.

* cited by examiner

*Primary Examiner* — Mark Kopec
*Assistant Examiner* — Haidung Nguyen
(74) *Attorney, Agent, or Firm* — Oblon, Spivak, McClelland, Maier & Neustadt, L.L.P.

(57) ABSTRACT

The present invention relates to a process for the preparation of compounds of general formula (I)

$$Li_{a-b}M^1{}_bV_{2-c}M^2{}_c(PO_4)_x \qquad (I)$$

wherein $M^1$, $M^2$, a, b, c and x have the following meanings:
$M^1$: Na, K, Rb and/or Cs,
$M^2$: Ti, Zr, Nb, Cr, Mn, Fe, Co, Ni, Al, Mg and/or Sc,
a: 1.5-4.5,
b: 0-0.6,
c: 0-1.98 and
x: number to equalize the charge of Li and V and $M^1$ and/or $M^2$, if present,
wherein a-b is >0,
to a compound according to general formula (I) as defined above, to spherical agglomerates and/or particles comprising at least one compound of general formula (I) as defined above, to the use of such a compound for the preparation of a cathode of a lithium ion battery or an electrochemical cell, and to a cathode for a lithium ion battery, comprising at least one compound as defined above.

20 Claims, 3 Drawing Sheets

PROCESS FOR THE PREPARATION OF POROUS CRYSTALLINE LITHIUM-, VANADIUM AND PHOSPHATE-COMPRISING MATERIALS

This application is a divisional of U.S. application Ser. No. 12/681,193 filed Aug. 18, 2010, which is a National Stage of PCT/EP2008/062427 filed Sep. 18, 2008, which claims benefit of 60/976,640 filed Oct. 1, 2007 and 61/024,631 filed Jan. 30, 2008, of which all are incorporated herein by reference.

The present invention relates to a process for the preparation of porous compounds comprising lithium, vanadium and phosphate, to a process for the preparation of mixtures comprising these compounds and at least one electrically conducting material, to the compounds and the mixtures, preparable by these processes and the use of these compounds and mixtures for the preparation of cathodes of lithium-ion batteries.

Processes for the preparation of $Li_3V_2(PO_4)_3$ are already known from the prior art.

U.S. Pat. No. 6,528,033 B1 discloses a method for making compounds like $Li_3V_2(PO_4)_3$ in a so-called carbo-thermal procedure. A mixture of $V_2O_5$, $Li_2CO_3$ $(NH_4)_2HPO_4$ and carbon is heated to 300° C. to remove ammonia, water and carbon dioxide, the cooled mixture is powderized and pelletized, and heated in an inert atmosphere to a temperature of 850° C. In the carbo-thermal procedure according to this document carbon is the agent which is reducing $V^{5+}$ to $V^{3+}$.

U.S. Pat. No. 5,871,866 discloses a procedure for the preparation of $Li_3V_2(PO_4)_3$ by mixing $Li_2CO_3$, $V_2O_5$ and $(NH_4)_2HPO_4$ in methanol and drying this slurry subsequently. The powder obtained therefrom is calcinated at a temperature of 875° C. in pure hydrogen as the reducing agent.

U.S. Pat. No. 5,910,382 discloses a process for the preparation of $Li_3V_2(PO_4)_3$ starting from $Na_3V_2(PO_4)_3$ by exchanging the sodium-ions with lithium-ions.

C. Wurm et al., Chem. Mater. 2002, 14, pages 2701 to 2710, disclose $LiM_xP_2O_7$, in which M is Fe or V which are prepared by mixing soluble precursor in water, followed by slow evaporation of water and annealing at temperatures of 300 to 800° C. in an atmosphere of nitrogen and hydrogen.

S. Patoux et al., J. Power Sources 119 to 121 (2003), pages 278 to 284, disclose pure monoclinic $Li_3M_2(PO_4)_3$, wherein M is Fe or V, by initial homogenization of precursors in aqueous solution followed by slow evaporation of $H_2O$ and volatile species and further annealing of the resulting solid under crystallisation. Annealing is conducted under an atmosphere of nitrogen and hydrogen.

The processes for the preparation of $Li_3V_2(PO_4)_3$ according to the prior art bear the drawback that an additional reducing agent has to be added to the reaction mixture or that the calcination step has to be conducted in a reducing atmosphere. Other disadvantages are that if solid compounds like $Li_2CO_3$ and $V_2O_5$ are mixed in solid phase, it is difficult to obtain a mixture having a homogenous dispersion of the different ions throughout the whole mixture. In addition, the processes according to the prior art are not appropriate to prepare the mentioned compounds in particles or agglomerates having channels going from the outer surface into the interior of the particles or agglomerates, allowing an improved penetration of the agglomerates with the electrolyte of the battery and therewith allowing an improved mass transport into and out of the particles or agglomerates.

The object of the present invention is to provide a process for the preparation of lithium-vanadium-phosphates which makes it possible to obtain these compounds in a very homogenously mixed and crystalline state. Moreover, it is an object of the present invention to provide a process enabling a decrease of the usually applied high calcination temperature of 800° C. and more to prepare a monophasic lithium-vanadium-phosphate. It is a further object to provide a process leading to a more finely devided material with a narrow size distribution of the crystallites, which in general enables an improved Li-ion diffusivity in the charging and discharging process of the Li-ion battery. In addition, the power characteristics and additionally the capacity of a Li-ion battery should be increased by improving the Li-ion diffusivity. In addition, it is an object of the present invention to provide a process for the preparation of the mentioned compounds which can be conducted easily and with only a few reaction steps. A further object of the present invention is to provide a process for the preparation of lithium-vanadium-phosphates as agglomerates and/or particles having channels going from the outer surface to the inside of the agglomerates and/or particles, in order to make an efficient mass transport possible.

These objects are achieved by a process for the preparation of compounds of general formula (I)

$$Li_{a-b}M^1{}_bV_{2-c}M^2{}_c(PO_4)_x \qquad (I)$$

wherein $M^1$, $M^2$, a, b, c and x have the following meanings:
$M^1$: Na, K, Rb and/or Cs,
$M^2$: Ti, Zr, Nb, Cr, Mn, Fe, Co, Ni, Al, Mg and/or Sc,
a: 1.5-4.5,
b: 0-0.6,
c: 0-1.98 and
x: number to equalize the charge of Li and V and $M^1$ and/or $M^2$, if present, wherein a-b>0,
comprising the following steps
(A) providing an essentially aqueous mixture comprising as substrates at least one lithium-comprising compound, at least one vanadium-comprising compound, in which vanadium has the oxidation state +5 and/or +4 and at least one $M^1$-comprising compound, if present, and/or at least one $M^2$-comprising compound, if present, at least one reducing agent which is oxidized to at least one compound comprising at least one phosphorous atom in oxidation state +5 and optionally at least one compound being able to generate at least one gaseous compound and/or at least one precursor of a gaseous compound,
(B) drying the mixture provided in step (A), in order to obtain a solid compound and
(C) calcining the solid compound obtained from step (B) at a temperature of 300 to 950° C.,
wherein at least one of the substrates generates at least one gaseous compound or at least one precursor of a gaseous compound and the at least one gaseous compound and/or the gaseous compound generated form the at least one precursor is liberated in step (B) and/or (C).

In a preferred embodiment, $M^1$, $M^2$, a, b and c have the following meanings:
$M^1$: Na,
$M^2$: Fe, Co, Ni, and/or Al,
a: 2.0-4.0, particularly preferred 2.5-3.5, specifically preferred 2.75-3.25, for example 2.9-3.1,
b: 0-0.6, particularly preferred 0-0.4, specifically preferred 0-0.2, for example 0.05, if present 0.01-0.6, particularly preferred 0.01-0.4, specifically preferred 0.01-0.2, for example 0.01-0.05, wherein a-b>0,
c: 0-1.8, particularly preferred 0 b is 1.0, for example 0-0.5, if present 0.1-1.8, particularly preferred 0.1 b is 1.0, for example 0.1-0.5.

x is chosen in order to equalize the charge of the compound of general formula (I), depending on the presence, oxidation state and the amount of Li and V, and optionally being present $M^1$ and/or $M^2$. x has always a value that, depending on Li and V, and $M^1$ and $M^2$, if present, a neutrally charged compound of general formula (I) is obtained. x can have values of 1.5 to 4.5.

For example, in a very preferred embodiment, $M^1$ and $M^2$ are absent, and c is 0, which makes x to be 3, in order to have a neutrally charged compound of general formula (I) $Li_3V_2(PO_4)_3$.

In a very preferred embodiment, the process according to the present invention is conducted in order to obtain the compound of formula $Li_3V_2(PO_4)_3$.

In further preferred embodiment, $M^1$, being for example Na, is present in an amount of up to 10 mol %, in respect of the sum of $L^1$ and $M^1$. In another preferred embodiment, $M^2$, being for example Fe, Co, Ni, Al, is present in an amount of up to 50 mol %, in respect of the sum of vanadium(III) and $M^2$ present in the compound.

Therefore, preferred embodiments of the present invention are embodiments, in which Li is substituted by $M^1$ in an amount of up to 10 mol % in respect of the sum of the amounts of $L^1$ and $M^1$, and vanadium(III) is substituted with $M^2$ in an amount of up to 50 mol %, in respect of the sum of the amounts of vanadium(III) and $M^2$.

Process steps (A), (B) and (C) are explained in the following in more detail:

Step (A):

Step (A) of the process according to the present invention comprises providing an essentially aqueous mixture comprising as substrates at least one lithium-comprising compound, at least one vanadium-comprising compound, in which vanadium has the oxidation state +5 and/or +4, and at least one $M^1$-comprising compound, if present, and/or at least one $M^2$-comprising compound, if present, at least one reducing agent which is oxidized to at least one compound comprising at least one phosphorous atom in oxidation state +5 and optionally at least one compound being able to generate at least one gaseous compound and/or at least one precursor of a gaseous compound.

In general, all Li-, $M^2$- and $M^3$-comprising compounds known to a person having ordinary skill in the art which are able to be incorporated in an essentially aqueous mixture in step (A) of the process can be used in the process according to the present invention.

In a preferred embodiment the at least one lithium-comprising compound in step (A) is chosen from the group consisting of lithium hydroxide LiOH, lithium hydroxide-hydrate LiOH*$H_2O$, lithium acetate LiOAc, lithium carbonate $Li_2CO_3$, lithium nitrate $LiNO_3$ and mixtures thereof. In a very preferred embodiment, lithium acetate LiOAc and/or lithium hydroxide-hydrate LiOH*$H_2O$ and/or lithium nitrate $LiNO_3$ are used as lithium-comprising compounds in step (A) of the process according to the present invention. Particularly preferred lithium acetate LiOAc or a combination of lithium acetate LiOAc and lithium hydroxide-hydrate LiOH*$H_2O$ are used as lithium-comprising compounds in the process according to the present invention.

The at least one lithium-comprising compound is added to the mixture in step (A) in the process according to the present invention in a concentration of in general 0.04 to 3 mol Li/l, preferably 0.2 to 2.0 mol Li/l, particularly preferred 0.3 to 1.5 mol Li/l, based on the whole reaction mixture in each case.

In general, all vanadium-comprising compounds in which vanadium has the oxidation state +5 and/or +4, known to a person having ordinary skill in the art can be used in the process according to the present invention which are able to be incorporated in an essentially aqueous mixture in step (A) of the process. According to the present invention, a single vanadium-comprising compound in which vanadium has the oxidation state +5, or a mixture of different vanadium-comprising in which vanadium has the oxidation state +5 can be used. In addition, a single vanadium-comprising compound in which vanadium has the oxidation state +4, or a mixture of different vanadium-comprising in which vanadium has the oxidation state +4 can be used. It is also possible that a mixture of different vanadium-comprising compounds can be used in which vanadium has the oxidation states +5 and +4, is used.

In a preferred embodiment, the vanadium-comprising compound in which vanadium has the oxidation state +5 is chosen from the group consisting of vanadium(V)-oxide $V_2O_5$, ammonium-metavanadate(V) $NH_4VO_3$, ammonium-polyvanadate and mixtures thereof. Ammonium-polyvanadate is a vanadium(V)-oxide, comprising ammonium-cations in an amount of about 5% by weight. Preferred vanadium-comprising compounds in which vanadium has the oxidation state +4 are chosen from the group consisting of vanadyl(IV) sulfate hydrate $VOSO_4.xH_2O$, vanadium(IV)oxide $VO_2$ and mixture thereof. x in $VOSO_4.xH_2O$ can have different meanings depending on the drying state of the compound, for example x is 0, if the compound has been dried completely.

In a preferred embodiment of the present application, at least one vanadium comprising compound is used in which vanadium has the oxidation state +5.

In a preferred embodiment of the process according to the present invention ammonium metavanadate(V) $NH_4VO_3$ is used as the vanadium comprising compound. In this case, $NH_3$ can be generated from this compound during the reaction in the process according to the present invention, and gaseous $NH_3$ can be liberated in step (B) and/or (C). If $NH_4VO_3$ is used in combination with LiOAc the compound $NH_4OAc$ is formed during the reaction in the process according to the present invention, and gaseous $NH_4OAc$ is liberated in step (B) and/or (C). If $NH_4VO_3$ is used in combination with $LiNO_3$ the compound $NH_4NO_3$ is formed during the reaction in the process, and gaseous $NH_4NO_3$ is liberated in step (B) or (C).

The at least one vanadium-comprising compound is added to the mixture in step (A) in the process according to the present invention in a concentration of in general 0.04 to 2.0 mol V/l, preferably 0.1 to 1.3 mol V/l, particularly preferred 0.2 to 1.0 mol V/l, based on the whole reaction mixture in each case.

The at least one $M^1$-comprising compound, if present, is chosen from the group consisting of sodium hydroxide NaOH, sodium hydroxide-hydrate NaOH*$H_2O$, sodium acetate NaOAc, sodium carbonate $Na_2CO_3$, and mixtures thereof. In a very preferred embodiment, sodium acetate NaOAc together with sodium hydroxide NaOH and/or sodium hydroxide-hydrate NaOH*$H_2O$ are used as sodium-comprising compounds in step (A) of the process according to the present invention. The preferred sodium-comprising compound is sodium acetate NaOAc.

The at least and/or $M^2$-comprising compound, if present, is chosen from compounds having the required cation and anion chosen from hydroxide, acetate, oxide, carbonate, halide, like fluoride, chloride, bromide, iodide, and mixtures thereof. In a very preferred embodiment, the anion of the at least one $M^2$-comprising compound is acetate, oxide, hydroxide, carbonate or mixtures thereof.

$M^1$- and/or $M^2$-comprising compounds are added to the essentially aqueous mixture, if present, in amounts, in which they are present in compounds of formula (I). A person having ordinary skill in the art knows how to calculate the required amount.

The process according to the present invention is preferably conducted by introducing at least one reducing agent into the mixture in step (A) of the process according to the present invention, which is oxidized to at least one compound comprising at least one phosphorous atom in an oxidation state +5 during the process according to the present invention. The use of at least one reducing agent, which is oxidized to at least one compound comprising at least one phosphorous atom in oxidation state +5 has the advantage that the oxidation product of this reducing agent gives rise to $PO_4^{3-}$-anions, which are needed in order to obtain the $PO_4^{3-}$-comprising compound of general formula (I).

In a preferred embodiment, the at least one reducing agent that is oxidized to at least one compound comprising at least one phosphorous atom in oxidation state +5, is carbon free. According to the present invention, carbon free means that no carbon atoms are present in the reducing agent. An advantage of a carbon free reducing agent, like $H_3PO_3$, is that the reduction can be conducted at low temperatures like 300 or 350° C., whereas carbon as reducing agent makes temperatures necessary of 600° C. and higher. These low temperatures make it possible to obtain nano crystalline materials. Nano crystalline materials can not be obtained advantageously at high temperatures which are necessary if carbon is used as the reducing agent.

In a preferred embodiment, the at least one reducing agent which is oxidized to at least one compound comprising at least one phosphorous atom in a oxidation state +5 is chosen from the group consisting of $H_3PO_3$, $(NH_4)H_2PO_3$, $(NH_4)_2HPO_3$, $(NH_4)_3PO_3$, $H_3PO_2$, $(NH_4)H_2PO_2$, $(NH_4)_2HPO_2$, $(NH_4)_3PO_2$ and mixtures thereof. In a particularly preferred embodiment $H_3PO_3$, $(NH_4)H_2PO_3$, $(NH_4)_2HPO_3$, $(NH_4)_3PO_3$ and mixtures thereof are used.

The at least one reducing agent which is oxidized to at least one compound comprising at least one phosphorous atom in oxidation state +5 is added to the mixture in step (A) in the process according to the present invention in a concentration of in general 0.04 to 2.0 mol P/I, preferably 0.1 to 1.3 mol P/I, particularly preferred 0.2 to 1.0 mol P/I, based on the whole reaction mixture in each case.

According to the present invention a combination of at least one reducing agent which is oxidized to at least one compound comprising at least one phosphorous atom in oxidation state +5 is added to the reaction mixture in step (A) of the process according to the present invention. The reducing agent that is used in the process according to the present invention will preferably be oxidized to $PO_4^{3-}$. Because the at least one reducing agent which is oxidized to at least one compound comprising at least one phosphorous atom in oxidation state +5 is added to the reaction mixture in a preferably at least equimolar amount, particularly preferred in an equimolar amount, $PO_4^{3-}$ is obtained as the oxidizing product in an amount high enough to be the complete amount of anion of the compound of general formula (I). According to this embodiment no compound having at least one phosphorous atom in oxidation state +5 has to be added.

In another preferred embodiment of the present application the essentially aqueous solution which is provided in step (A) additionally comprises at least one compound comprising at least one phosphorous atom in oxidation state +5. In this preferred embodiment of the present invention a combination of at least one reducing agent which is oxidized to at least one compound comprising at least one phosphorous atom in oxidation state +5 and at least one compound comprising at least one phosphorous atom in oxidation state +5 is added to the reaction mixture in step (A) of the process according to the present invention. The reducing agent that is used in the process according to the present invention will preferably be oxidized to $PO_4^{3-}$. In this embodiment of the process according to the present application, $PO_4^{3-}$ that is obtained as the oxidizing product is not present in an amount high enough to be the complete amount of anion of the compound of general formula (I). Therefore, in this embodiment, at least one compound having at least one phosphorous atom in oxidation stage +5 has to be added.

This at least one compound comprising at least one phosphorous atom in oxidation state +5 will be the second source of $PO_4^{3-}$-anions, which have to be incorporated into the compound of general formula (I).

Preferred compounds comprising at least one phosphorous atom in oxidation state +5 which are optionally added in step (A) are chosen from the group consisting of $H_3PO_4$, $(NH_4)H_2PO_4$, $(NH_4)_2HPO_4$, $(NH_4)_3PO_4$ and mixtures thereof. Particularly preferred are $H_3PO_4$, $(NH_4)H_2PO_4$, $(NH_4)_2HPO_4$ and mixtures thereof.

The at least one compound comprising at least one phosphorous atom in oxidation state +5 is optionally added to the mixture in step (A) in the process according to the present invention in a concentration of in general 0.02 to 1.0 mol P/I, preferably 0.05 to 0.65 mol P/I, particularly preferred 0.1 to 0.5 mol P/I, based on the whole reaction mixture in each case.

In a further preferred embodiment, in addition to the at least one reducing agent which is oxidized to at least one compound comprising at least one phosphorous atom in oxidation state +5 and optionally at least one compound comprising at least one phosphorous atom in oxidation state +5, at least one additional reducing agent is added to the mixture in step (A) of the process according to the present invention. The additional reducing agent may also be carbon-free or may contain carbon. The at last one additional reducing agent preferably is chosen from hydrazine or derivatives thereof, hydroxyl amine or derivatives thereof, reducing sugars, like glucose, saccharose, alcohols like aliphatic alcohols having 1 to 10 carbon atoms like methanol, ethanol, propanols, for example n-propanol or iso-propanol, butanols, for example n-butanol, iso-butanol, ascorbic acid, compounds comprising easily oxidisable double bonds, and mixtures thereof.

Examples of derivatives of hydrazine are hydrazine-hydrate, hydrazine-sulfate, hydrazine-dihydrochloride and others. An example of a derivative of hydroxylamine is hydroxyl amine-hydrochloride. Particularly preferred carbon-free reducing agents which are not oxidized to at least one compound comprising at least one phosphorous atom in oxidation state +5 are hydrazine, hydrazine-hydrate, hydroxyl amine or mixtures thereof.

The at least one reducing agents which are optionally added are by nature not able to deliver $PO_4^{3-}$-anions as oxidation products which can be incorporated into the compound of general formula (I). Therefore, if at least one of these additional reducing agents is used, it is also necessary to use these reducing agents in combination with at least one compound comprising which is oxidized to at least one compound comprising at least one phosphorous atom in oxidation state +5 and optionally at least one compound comprising at least one phosphorous compound in oxidation state +5. In these cases the amount and the concentrations of the at least one compound which is oxidized to at least one compound comprising at least one phosphorous atom in oxidation state +5, optionally at least one compound comprising at least one phosphorous atom in oxidation state +5 and optionally at least one additionally reducing agent, which are added in step (A)

have to be adjusted accordingly. A person having ordinary skill in the art does know how the respective amount has to be calculated.

The at least one additional reducing agent is optionally added to the mixture in step (A) in the process according to the present invention in a concentration which depends strongly on the reducing power and reducing potential of this agent. A person having ordinary skill in the art does know how the respective amount has to be calculated.

If a combination of at least one reducing agent which is oxidized to a compound comprising at least one phosphorous compound in oxidation stage +5, preferably $H_3PO_3$, and at least one compound comprising at least one phosphorous atom in oxidation stage +5, preferably $H_3PO_4$, is added in step (A) of the process according to the present invention, this combination is preferably added in a ratio, for example, $H_3PO_3/H_3PO_4$, which is larger than the ratio that is necessary to obtain the desired compound according to general formula (I). A person having ordinary skill in the art does know how to calculate the stoichiometric amounts of the components in the mixture of step (A) according to the present invention.

In a preferred embodiment, the at least one lithium-comprising compound, the at least one vanadium-comprising compound, in which vanadium has the oxidation state +5 and/or +4, at least one reducing agent which is oxidized to at least one compound comprising at least one phosphorous atom in oxidation state +5, and optionally at least one compound comprising at least one phosphorous atom in oxidation state +5, are added to the essentially aqueous mixture in amounts that are adjusted in a way that the stoichiometry according to general formula (I) is obtained. A person having ordinary skill in the art does know how to calculate the necessary amounts. In another preferred embodiment of the present invention, the at least one lithium-comprising compound is added in an amount that is ≥1% by weight, preferably ≥2% higher than the stoichiometric amount according to general formula (I).

The mixture which is provided in step (A) of the process according to the present invention is essentially aqueous. The wording "essentially" in this application has the meaning that more than 80% by weight, preferably more than 90% by weight, particularly preferably more than 95% by weight of the solvent, which is used to provide the essentially aqueous mixture in step (A) of the process according to the present invention, is water.

In addition to water, further solvents that are miscible with water can be present. Examples of these solvents are aliphatic alcohols having 1 to 10 carbon atoms like methanol, ethanol, propanols, for example n-propanol or iso-propanol, butanols, for example n-butanol, iso-butanol. According to the present invention, alcohols can be added as additional reducing agent and/or as additional solvent.

In a very preferred embodiment, the solvent that is used in step (A) of the process according to the present invention is water without any additional solvents.

The order, in which the different components are added to the solvent or mixture of solvents in step (A), is not determined. In a preferred embodiment, the $M^1$-comprising compound is added first to the solvent, the vanadium-comprising compound, in which vanadium has oxidation state +5 and/or +4, is added as the second component. The at least one reducing agent and optionally the at least one compound having at least one phosphorous atom having the oxidation state +5, and optionally the at least one additional reducing agent and optionally at least one compound being able to generate at least one gaseous compound and/or at least one precursor of a gaseous compound, are added subsequently.

In a preferred embodiment of the present invention, the mixture obtained from step (A) of the process according to the present invention is an essentially aqueous solution of at least one lithium-comprising compound, at least one vanadium-comprising compound, in which vanadium has the oxidation state +5 and/or +4, at least one reducing agent which is oxidized to at least one compound comprising at least one phosphorous atom in oxidation state +5 and at least one compound being able to generate at least one gaseous compound and/or at least one precursor of a gaseous compound.

Step (A) can be conducted in all suitable reactors that are known to a person skilled in the art. Step (A) can be conducted continuously or discontinuously.

The temperature, under which step (A) of the process according to the present invention is conducted is 10 to 120° C., preferably 60 to 100° C., particularly preferably 70 to 95° C. If temperatures higher than 100° C. are used, the reaction mixture has to be present in a pressure-resistant reactor, because of the boiling point of water.

In a preferred embodiment the mixture is stirred in step (A) for a time of 0.1 to 24 hours, particularly preferred 0.5 to 18 hours. The pH-Value of the mixtures to the end of stirring is in general below pH 11, for example at 2.0 to 9.0.

Step (A) of the process according to the present invention can be conducted under an inert atmosphere. Examples of inert gases are nitrogen, noble gases like helium or argon. In a preferred embodiment, step (A) is conducted under a nitrogen atmosphere.

Reduction of most of the $V^{5+}$ to $V^{4+}$ and/or $V^{3+}$ and/or $V^{4+}$ to $V^{3+}$ is in general conducted in step (A) and/or step (B) of the process according to the present invention. It is further possible that completion of reduction to $V^{3+}$ occurs in step (C) of the process according to the present invention. It is possible that reduction immediately starts after addition of the reducing agent. It is further possible that reduction starts after the reaction mixture is heated to an increased temperature of 40 to 100° C., preferably 60 to 95° C. In another preferred embodiment, if a combination of two P-comprising compounds is used as the reducing agent, for example $H_3PO_3/H_3PO_4$, the reduction starts, when both components are added. In a preferred embodiment at least 50%, particularly preferred at least 75% of the $V^{5+}$ and/or $V^{4+}$ present in the reaction mixture is reduced to $V^{4+}$ and/or $V^{3+}$ in steps (A) and/or (B) of the process according to the present invention.

In a further preferred embodiment at least one additional compound is added in step (A) of the process according to the present invention that is gaseous or is a precursor of a gaseous compound that is liberated in step (B) and/or (C) of the process according to the present invention. In this embodiment, the gaseous compound which is liberated in step (B) and/or (C) of the process is a combination of the gaseous compound derived from at least one of the substrates as mentioned above and the gaseous compound that is additionally added or that is derived from an additionally added compound. Examples of compounds that can additionally be added are all compounds that become gaseous under the conditions that are present in step (B) and/or (C) of the process according to the present invention.

In a preferred embodiment of the process according to the present invention, at least one additional compound being able to generate at least one gaseous compound and/or at least one precursor of a gaseous compound is added in step (A). The compound which is able to generate at least one gaseous compound is preferably chosen from the group consisting of $NH_3$, preferably in aqueous solution, $NH_4$-salts and mixtures thereof. In a further preferred embodiment the $NH_4$-salt is chosen from the group consisting of $NH_4NO_3$, $NH_4NO_2$, $NH_4Cl$, $NH_4$-carboxylates like $NH_4OAc$ or $NH_4$-formiate and mixtures thereof.

Further suitable compounds being able to generate at least one gaseous compound and/or at least one precursor of a gaseous compound are organic solvents that are miscible with water and which are gaseous under the conditions of step (B) and/or (C), like alcohols having 1 to 8 carbon atoms, like methanol, ethanol, propanols, for example n-propanol, iso-propanol, butanols, for example n-butanol, iso-butanol, polyols, for example diethylenglycol, propylenglycol, 1,4-butandiol, and further monomeric, oligomeric or polymeric organic compounds, like polyacrylates, polyetherols.

If the optionally additionally added compound which is gaseous under the conditions of step (B) and/or (C) is also an alcohol, the total amount of added alcohols is considered for the essentially aqueous mixture as mentioned above.

Step (B):

Step (B) of a process according to the present invention comprises drying the mixture provided in step (A), in order to obtain a solid compound.

In step (B), the mixture obtained from step (A) is converted into a solid compound. The drying of the mixture provided in step (A) of the process according to the present invention can be conducted with all methods known to a person having ordinary skill in the art and which are suitable for the removal of water of an aqueous mixture of the components as mentioned above.

Preferred methods for drying the mixture from step (A) in step (B) are spray-drying, freeze-drying or combinations thereof. According to the present invention, the drying in step (B) can be conducted only by spray-drying, only by freeze-drying or by a combination of the spray-drying and freeze-drying, in both orders.

Spray-drying is preferably conducted by passing the mixture obtained from step (A) through one or more narrow nozzles, wherein fine drops are being obtained which are dried by a stream of hot air or nitrogen. Alternatively the spraying can be achieved via a rotating disc. In a preferred embodiment a stream of hot air or nitrogen is used having a temperature of 100 to 500° C., particularly preferred 110 to 350° C. Spray-drying is normally conducted directly with the mixture of step (A) without any intermediate steps. Spray-drying normally gives rise to spherical agglomerates having an average diameter of <0.5 mm. In order to obtain spherical agglomerates having a diameter of 10-30 μm, in a preferred embodiment of step (B) diluted solutions can be used and spray-drying of these diluted solutions can be conducted using high pressure nozzles.

In a second embodiment, step (B) of the process according to the present invention is conducted by freeze-drying. The sprayed mixture is therefore sprayed into, for example liquid nitrogen. The particles obtained therefrom can be dried in vacuum at a low temperature.

In a preferred embodiment step (B) of the process according to the present invention is conducted under an inert atmosphere. Suitable inert gases are chosen from nitrogen or noble gases like helium or argon. A preferred inert gas is nitrogen.

The drying in step (B) is conducted in order to obtain a dry solid. In a preferred embodiment, the solids obtained show an amorphous structure in the X-ray pattern. In a preferred embodiment, the drying in step (B) of the process according to the present invention is conducted in order to obtain a solid having an amount of water present in the solid of less than 40% by weight, preferably less than 35% by weight, particularly preferably less than 25% by weight.

In a preferred embodiment, in addition in step (B) of the process according to the present invention the at least one gaseous compound generated from at least one substrate and/or the additionally added gaseous compound are, at least partially, liberated in step (B) of the process. Liberating the at least one gaseous compound makes it possible to obtain channels going from the inside of the generated spherical agglomerates to the outer surface. This channels are created by the at least one gaseous compound on their way through the spherical agglomerate, driven by the increase of volume during evaporation.

In processes according to the prior art, water is in general used as solvent and this water is in every case evaporated into gaseous water steam in the spray-drying process. This steam in every case will generate certain porosity in the agglomerates generated in the spray-drying process. The special target of the process according to the present invention is to increase this certain porosity to significantly higher values. Therefor substrates being able to decompose to gaseous compounds within the spray-drying process and/or within or calcining process are used. Furthermore, preferably additional additives are used in the aqueous slurry which induce a larger porosity in the resulting agglomerates during the spray-drying process and/or calcination step by decomposition in gaseous compounds than the porosity which is induced by the evaporation of the water itself in the spray-drying and calcination process.

After step (B) the desired solid is present in preferably spherical particles having a diameter of 3 to 200 μm, preferably 5 to 100 μm, very preferably 8 to 50 μm.

Step (C):

Step (C) of the process according to the present invention comprises calcining the solid compound obtained from step (B) at a temperature of 300 to 950° C. Step (C) is preferably conducted at a temperature of 375 to 900° C., particularly preferably at a temperature of 400 to 850° C.

Calcination is preferably conducted under an inert gas atmosphere. Examples of inert gases are nitrogen or noble gases like helium and/or argon. In a preferred embodiment, nitrogen is used in step (C) of the process according to the present invention.

One advantage of the process according to the present invention is that calcination can be conducted under an inert atmosphere and no need exists to conduct step (C) under a reducing atmosphere according to the prior art. Based thereon the process according to the present invention can be conducted in a more time and cost saving way. The absence of a reducing agent, for example hydrogen, avoids the presence of explosive gaseous mixtures.

Step (C) of the process according to the present invention in general is conducted for a time of 0.1 to 5 hours, preferably 0.5 to 3 hours. In a very preferred embodiment of step (C), the temperature is increased during a period of 0.01 to 2 hours, preferably 0.1 to 1.5 hours, then, the temperature is hold for a period of 0.1 to 2 hours, preferably 0.5 to 1.5 hours, and at the end the temperature is decreased to room temperature.

In a preferred embodiment, the product obtained from step (C) consists essentially of spherical agglomerates and/or particles having an average diameter of 3 to 200 μm, preferably 5 to 100 μm, very preferred 8 to 50 μm.

In addition to step (B) of the process according to the present invention it is further possible that the at least one gaseous compound generated from at least one substrate and/or the additionally added gaseous compound are, at least partially, liberated in step (C) of the process. In another embodiment of the present invention it is possible that channels that have already been created in step (B) are further enlarged, or new channels are prepared in step (C). In a preferred embodiment of the present invention channels in the particles are created in both steps (B) and (C), in a very preferred embodiment mainly in step (C).

The temperature of calcination has a significant impact onto the specific surface of the compound according to general formula (I). In general low temperatures during calcination give rise to high specific surface area. High temperatures during calcination give usually rise to low specific surface area. The process according to the present invention makes it possible to obtain high surface areas at high calcination temperatures of 600 to 800° C. The surface area of the compounds according to the present invention is significantly higher than the surface area of compounds being prepared in absence of a compound generating a gaseous compound during processing. This finding can be explained by the generation of very porous agglomerate structures with high specific surface areas at high calcination temperatures.

The agglomerates and/or particles that are obtained from step (C) of the process according to the present invention have in general a specific BET surface area of 0.01 to 50 m²/g, preferably 0.1 to 30 m²/g.

Suitable apparatuses for step (C) are known to the person having ordinary skill in the art, one example is a rotary furnace. The residence time in a rotary furnace is based on the inclination and the rotating speed of the furnace. A person having ordinary skill in the art does know how a suitable residence time is adjusted in the rotary furnace. In a preferred embodiment the solid that is calcinated in step (C) of the process according to the present invention is moved during calcination, for example in a fluidized bed reactor or in a rotary furnace. The solid can also be stirred during calcination.

Step (C) of the process according to the present invention is in general conducted under a pressure that is suitable that preferably complete conversion into the desired products is obtained. In a preferred embodiment step (C) is conducted under a pressure which is slightly higher than atmospheric pressure, in order to prevent oxygen penetrating the reactor from the outside. This slightly increased atmospheric pressure is preferably caused by at least one inert gas that is streaming over the solid compound that is calcinated in this step.

The process according to the present invention can be conducted continuously or discontinuously. In a preferred embodiment the process according to the present invention is conducted discontinuously.

In a preferred embodiment of the process according to the present application, the solid compound obtained from step (B) or from step (C) is milled prior to step (C) and/or after step (C), in order to obtain crystalline agglomerates and/or particles having the required size. Suitable mills are known to a person having ordinary skill in the art. Examples are jet mills, which supply very low abrasion, preferably under the use of nitrogen and/or air. In general the channels within the agglomerates or particles are not destroyed in this milling step.

The present invention further relates to a compound according to general formula (I) as mentioned above, preparable by the process according to the present invention. The compounds according to general formula (I) preparable by the process according to the present invention show improved crystallinity compared to compounds prepared by processes according to the prior art. In addition the size distribution obtained is narrower compared to the prior art. The crystallinity of the solids obtained is improved and the solids obtained have an improved dispersion of ingredients.

In addition, the compounds according to the present invention are obtained in spherical agglomerates and/or particles having channels going from the inside of the agglomerates and/or particles to the outer surface. The present invention therefore further relates to spherical agglomerates and/or particles comprising at least one compound of general formula (I) as mentioned above and having channels going from the inside of the agglomerates and/or particles to the outer surface. Further characteristic features of these agglomerates and/or particles are mentioned above.

Because of this fact the compounds of general formula (I) preparable by the process according to the present invention are particularly suitable for the use for the preparation of a cathode of a lithium-ion battery or an electrochemical cell. Therefore the present invention also relates to the use of a compound of general formula (I) preparable by the process according to the present invention or a spherical agglomerate and/or particle according to the present invention for the preparation of a cathode of a lithium-ion battery or an electrochemical cell.

The present invention further relates to a cathode for a lithium-ion battery, comprising at least one compound according to general formula (I) preparable by the process according to the present invention or a spherical agglomerate and/or particle according to the present invention. To obtain a cathode as mentioned above the compound according to general formula (I) is mixed with at least one electrically conducting material, described for example in WO 2004/082047.

Suitable electrically conducting materials are for example carbon black, graphite, carbon fibres, carbon nanofibres, carbon nanotubes or electrically conducting polymers. Typically 2.0 to 40% by weight of the at least one electrically conducting material are used together with the compound according to general formula (I) in the cathode. To obtain the cathode the electrically conducting material and the compound according to general formula (I) are mixed, optionally in the presence of an organic solvent and optionally in the presence of an organic binder, for example polyisobutene, and this mixture is optionally formed and dried. A temperature of 80 to 150° C. is applied in the drying step.

In a preferred embodiment the at least one electrically conducting material is added during the preparation of compounds according to general formula (I) as mentioned above. In a preferred embodiment, the at least one electrically conducting material is added to the mixture of the starting materials in the preparation of the compound according to general formula (I).

Therefore, the present invention also relates to a process for the preparation of a mixture comprising at least one compound according to general formula (I) as defined above and at least one electrically conducting material comprising the following steps (D) providing an essentially aqueous mixture comprising at least one electrically conducting material, and as substrates at least one lithium-comprising compound, at least one vanadium-comprising compound, in which vanadium has the oxidation state +5 and/or +4, and at least one $M^1$-comprising compound, if present, and/or at least one $M^2$-comprising compound, if present, at least one reducing agent which is oxidized to at least one compound comprising at least one phosphorous atom in oxidation state +5 and optionally at least one compound being able to generate at least one gaseous compound and/or at least one precursor of a gaseous compound, (E) drying the mixture provided in step (D), in order to obtain a solid compound and (F) calcining the solid compound obtained from step (E) at a temperature of 300 to 950° C.,
wherein at least one of the substrates generates at least one gaseous compound and/or at least one precursor of a gaseous compound and the at least one gaseous compound and/or the gaseous compound generated from the at least one precursor of a gaseous compound is liberated in step (E) and/or (F).

In a preferred embodiment of this process according to the present invention, the essentially aqueous solution which is provided in step (D) additionally comprises at least one compound comprising at least one phosphorous atom in oxidation state +5.

The Li-, and optionally $M^1$- and/or $M^2$-comprising compounds, the vanadium-comprising compounds, the at least one reducing agent which is oxidized to at least one compound comprising at least one phosphorous atom in oxidation state +5, the optionally present at least one compound comprising at least one phosphorous atom in oxidation state +5, the optional at least one compound being able to generate at least one gaseous compound and/or at least one precursor of a gaseous compound, the electrically conductive materials, the apparatuses and the process parameters of the steps (D) to (F) correspond to the ones described above. In addition to the at least one reducing agent which is oxidized to at least one compound comprising at least one phosphorous atom in oxidation state +5 and the optionally present at least one compound comprising at least one phosphorous atom in oxidation state +5, at least one additional reducing agent can be added in a preferred embodiment, as mentioned and defined above.

In a preferred embodiment the electrically conducting material is chosen from the group consisting of carbon black, graphite, carbon fibres, carbon nanofibres, carbon nanotubes, electrically conducting polymers or mixtures thereof.

If carbon black, graphite or substances essentially consisting of carbon are used as electrically conducting materials in step (D), these materials are preferably suspended in a mixture, preferably an essentially aqueous solution, of the other components. This can be achieved by direct addition of these electrically conducting materials to the mixture of the other components. Alternatively, carbon black, graphite or substances essentially consisting of carbon can be suspended in an aqueous solution of hydrogen peroxide, and this suspension can then be added to a solution of one or more components as mentioned above. Treatment with hydrogen peroxide normally improves the wettability of carbon with water and makes it possible to obtain carbon containing suspensions having an improved stability, i.e. having a lower tendency for demixing. In addition the homogenous dispersion of the electrically conducting material in the mixture is improved.

The process comprising steps (D), (E) and (F) generates agglomerates and/or particles comprising at least one compound of general formula (I) as mentioned above and at least one electrically conductive material having channels going from the inside of the agglomerates and/or particles to the outer surface.

The present invention also relates to a mixture, comprising at least one compound according to general formula (I) as defined above and at least one electrically conductive material, preparable by a process as mentioned above. In contrast to materials according to the prior art, these mixtures according to the present invention show an improved dispersion of the at least one electrically conducting material in the mixture.

The present invention further relates to a agglomerate and/or particle comprising at least one compound of general formula (I) as defined above and at least one electrically conducting material having channels going from the inside of the agglomerates and/or particles to the outer surface. Other characteristics of these agglomerates and/or particles are mentioned above.

Therefore, the present invention also relates to the use of a mixture according to the present invention or an agglomerate and/or particle according to the present invention for the preparation of a cathode of a lithium-ion battery or an electrochemical cell.

The present invention also relates to a cathode for a lithium-ion battery, comprising a mixture according to the present invention or an agglomerate and/or particle according to the present invention.

For the preparation of a cathode using the compound according to general formula (I) as mentioned above or a mixture comprising the compound according to general formula (I) and at least one electrically conducting material as mentioned above, in a preferred embodiment the following binders are used:

Polyethyleneoxide (PEO), cellulose, polyethylene, polypropylene, polytetrafluoroethylene, polyacrylonitrile-methylmethacrylate, styrene-butadiene-copolymers, tetrafluoroethylene-hexyluoropropylene-copolymers, polyvinylidenefluoride-hexafluoropropylene-copolymers (PVdF-HFP), perfluoroalkyl-vinylether-copolymers, vinylidenefluoride-chlorotrifluoroethylene-copolymers, ethylene-chlorofluoroethylene-copolymers, ethylene-acrylic acid-copolymers (with and without sodium ions included), ethylene-methacrylic acid (with and without sodium ions included), polyimides and polyisobutene.

The binder is normally added in an amount of 1 to 10% by weight, preferably 2 to 8% by weight, particularly preferred 3 to 7% by weight, in each case based on the whole cathode material.

The mixture comprising at least one compound according to general formula (I) and at least one electrically conducting material have preferably a BET surface area of 0.5 to 50 m²/g.

FIGURES

The present invention is further illustrated by the following examples:

EXAMPLES

Example 1

$Li_3V_2(PO_4)_3$ from $LiOH*H_2O$, $LiCH_3COO$, $NH_4VO_3$, $H_3PO_3$, $H_3PO_4$ ("stoichiometric")

($NH_4VO_3$ is reduced by $H_3PO_3$ to $V^{3+}$, $H_3PO_3$ is oxidized to $PO_4^{3-}$ and water, gaseous $NH_4OAc$ is generated by $NH_4^+$ and $OAc^-$ ions)

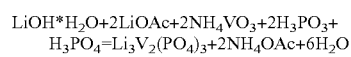

Figure 1:
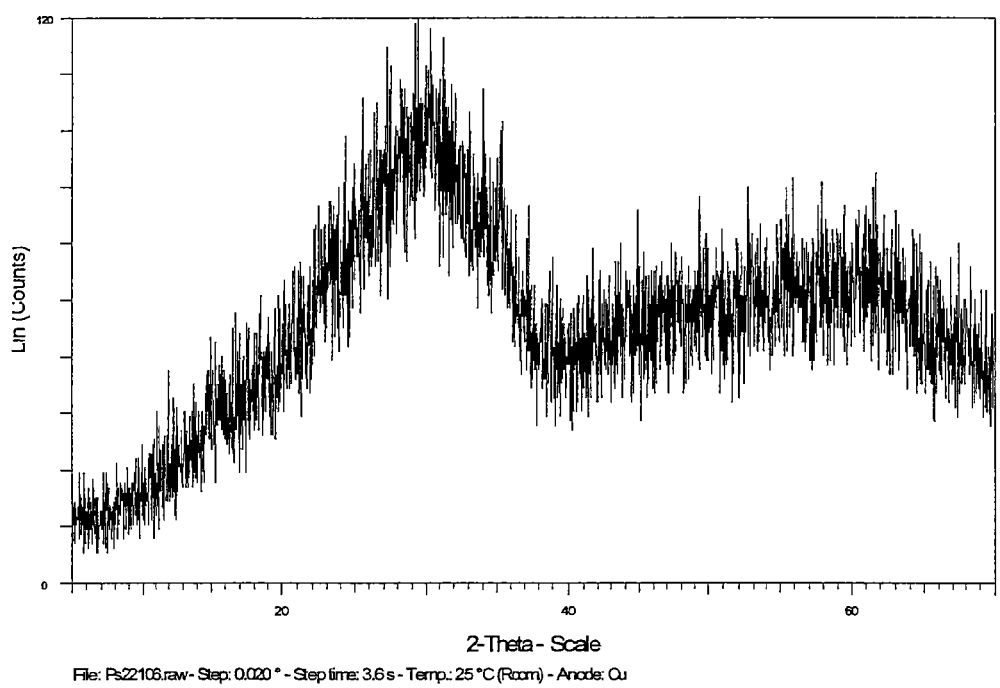
FIG. 1 shows X-ray powder diffraction pattern of the spray-dried powder. The sample is X-ray amorphous.

6 l water are placed in a 10-l-glass reactor which is heatable from the outside at 90° C. under streaming $N_2$ (50 NL/h). The streaming $N_2$-cover is maintained during the further reaction. Under stirring 87.48 g $LiOH*H_2O$ (57.49% per weight LiOH, 2.1 mol Li, Chemetall GmbH, D-60487 Frankfurt, Germany) and 279.92 g LiCH$_3$COO (99%, 4.2 mol Li, Chempur, D-76204 Karlsruhe, Germany) are dissolved in these 6 l water which are heated to 90° C. to give a clear solution. 468.15 g NH$_4$VO$_3$ (99.95%, 4 mol V, H.C. Starck, D-38615-Gosslar, Germany) are dissolved in this solution to give a clear, lightly yellow aqueous solution. 334.69 g H$_3$PO$_3$ (98%, 4 mol P, Acros Organics, B-2440 Geel, Belgium) are dissolved therein, whereas a clear, orange-coloured solution is obtained. 230.58 g H$_3$PO$_4$ (85%, 2 mol P, Riedel-de-Haen, D-30926 Seelze, Germany) are added. A dark blue-black coloured, aqueous mixture having no visible solids is obtained. This aqueous mixture is stirred under maintaining the streaming N$_2$-cover for 16 hours at 90° C. The solution is subsequently spray-dried in a spray-dryer (type Minor MM, Niro, Denmark) under nitrogen (inlet temperature=330° C., outlet temperature=106° C.). The dark-grey spray-powder obtained therefrom shows an amorphous structure in the X-ray powder diffraction pattern (FIG. 1).

50 g of the so-obtained spray powder are heated during one hour to an end temperature T in a continuously rotating (7 rpm) 1-l-spherical quartz glass in a laboratory rotary furnace (BASF), held at this temperature T for one hour and is subsequently cooled under streaming N$_2$ to room temperature.

Example 1.1

Figure 2:
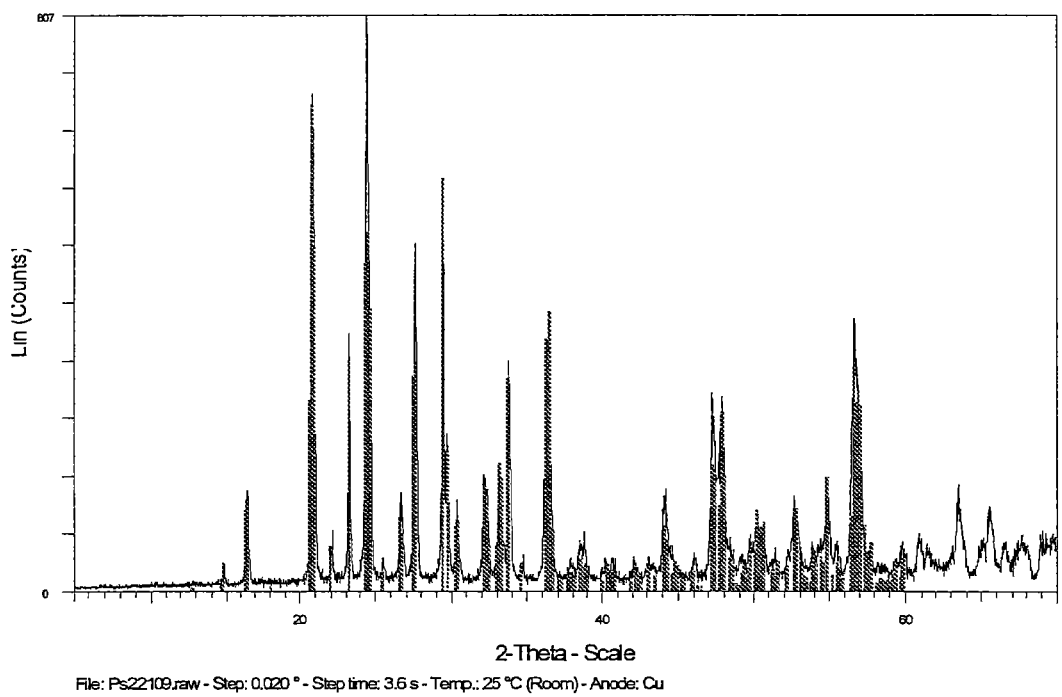
FIG. 2 shows X-ray powder diffraction pattern of monophasic $Li_3V_2(PO_4)_3$ (isostructural with $Li_3Fe_2(PO_4)_3$, BET=11.0 m²/g) prepared by calcination of the amorphous, spray-dried powder (FIG. 1) at 400° C. under nitrogen.

The end temperature T of 600° C. gives a powder having a BET-surface area of 15.2 m$^2$/g and a X-ray powder diffraction pattern showing the monophasic structure of Li$_3$Fe$_2$(PO$_4$)$_3$, being isostructural with Li$_3$V$_2$(PO$_4$)$_3$ (FIG. 2). The powder shows a spherical habitus in scanning electron microscopy (SEM) having an average spherical size of about 30 μm. The surface of the sphericals shows small porous channels going into the interior of the sphericals.

Example 1.2

Figure 3:
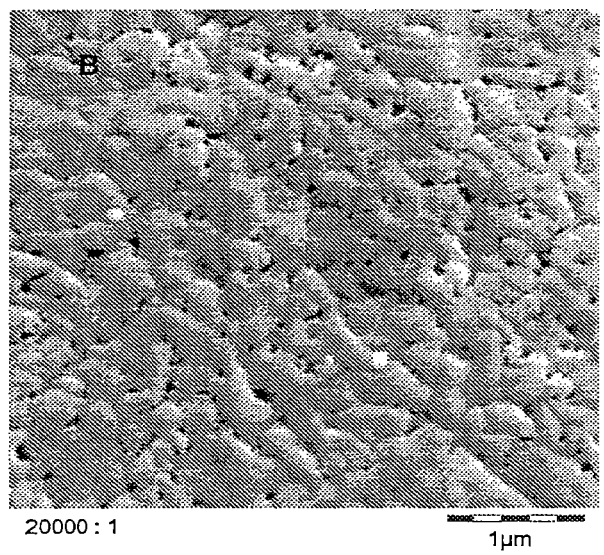
FIG. 3 shows a SEM picture of the surface of an agglomerate with a diameter of about 30 microns prepared by calcination at 700° C.

End temperature T of 700° C. gives a powder having a BET-surface area of 11.0 m$^2$/g and a X-ray powder diffraction pattern showing the monophasic structure of Li$_3$Fe$_2$(PO$_4$)$_3$, being isostructural with Li$_3$V$_2$(PO$_4$)$_3$. The powder shows a spherical habitus in scanning electron microscopy having an average spherical size of about 30 μm. The surface of the sphericals shows small porous channels going into the interior of the sphericals (FIG. 3).

Comparison Example 1

Li$_3$V$_2$(PO$_4$)$_3$ from LiOH*H$_2$O, V$_2$O$_5$, H$_3$PO$_3$, H$_3$PO$_4$ ("stoichiometric")

(V$_2$O$_5$ is reduced by H$_3$PO$_3$ to V$^{3+}$, H$_3$PO$_3$ is oxidized to PO$_4$$^{3-}$ and water)

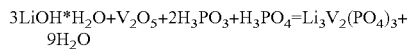

In a 10 l-glass-reactor which is heatable from the outside, 6 l water are placed at 80° C. under streaming N$_2$ (50 NL/h). The streaming N$_2$-cover is maintained during the further process. Under stirring 262.45 g LiOH*H$_2$O (57.49% LiOH, 6.3 mol Li, Chemetall GmbH, D-60487 Frankfurt, Germany) are added and dissolved to give a clear, colourless solution. 363.76 g V$_2$O$_5$ (99.97%, 2 Mol V$_2$O$_5$, GfE Umwelttechnik GmbH, D-90431 Nürnberg, Germany) are added. After dissolution of the V$_2$O$_5$ a clear, yellow-coloured solution is obtained. 334.69 g H$_3$PO$_3$ (98%, 4 mol P, Acros Organics, B-2440 Geel, Belgium) are added to this solution during 0.5 minutes. A clear, orange-coloured solution is obtained. 230.58 g H$_3$PO$_4$ (85%, 2 Mol P, Fa. Riedel-de-Haen, D-30926 Seelze) are added. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray-powder obtained therefrom shows an amorphous structure in the X-ray powder diffraction pattern.

50 g of the obtained spray powder are subsequently added to a continuously rotating (7 rpm) 1 l-crystal ball under streaming nitrogen (15 NL/h) in a laboratory rotary furnace (BASF) and heated in one hour to an end temperature T, is hold at this temperature T for one hour and is subsequently cooled to room temperature under streaming N$_2$.

Comparison Example 1.1

The end temperature T of 600° C. gives rise to a powder having a BET-surface of 0.5 m$^2$/g and a X-ray powder diffraction pattern, showing essentially the monophasic structure of Li$_3$Fe$_2$(PO$_4$)$_3$ being iso-structural with the product Li$_3$V$_2$(PO$_4$)$_3$. Scanning electron microscopy shows that the powder has a spherical habitus having a medium spherical size of about 30 μm.

Comparison Example 1.2

The end temperature T of 700° C. gives rise to a powder having a BET-surface of 0.2 m$^2$/g and a X-ray powder diffraction pattern, showing essentially the monophasic structure of Li$_3$Fe$_2$(PO$_4$)$_3$ being iso-structural with the product Li$_3$V$_2$(PO$_4$)$_3$. Scanning electron microscopy shows that the powder has a spherical habitus having a medium spherical size of about 30 μm.

Example 2

Li$_3$V$_2$(PO$_4$)$_3$ from LiCH$_3$COO, NH$_4$VO$_3$, H$_3$PO$_3$, H$_3$PO$_4$, NH$_3$ ("stoichiometric")

(NH$_4$VO$_3$ is reduced to V$^{3+}$, H$_3$PO$_3$ is oxidized to H$_3$PO$_4$; NH$_4$OAc is generated from NH$_4$$^+$, CH$_3$COO$^-$ and NH$_3$; additional excess of NH$_3$ applied)

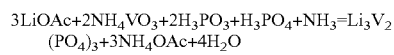

6 l water are placed in a 10-l-glass reactor which is heatable from the outside at 90° C. under streaming N$_2$ (50 NL/h). The streaming N$_2$-cover is maintained during the further reaction. Under stirring 415.74 g LiCH$_3$COO (99%, 6.3 mol Li, Chempur, D-76204 Karlsruhe, Germany) are dissolved in these 6 l water which are heated to 90° C. to give a clear solution. 468.15 g NH$_4$VO$_3$ (99.95%, 4 mol V, H.C. Starck, D-38615-Gosslar, Germany) are dissolved in this solution to give a clear, lightly yellow aqueous solution. 334.69 g H$_3$PO$_3$ (98%, 4 mol P, Acros Organics, B-2440 Geel, Belgium) are dissolved therein, whereas a clear, orange-coloured solution is obtained. 230.58 g H$_3$PO$_4$ (85%, 2 mol P, Riedel-de-Haen, D-30926 Seelze, Germany) and 156.4 g of an aqueous NH$_3$-solution (25%, 2.3 mol NH$_3$, Bernd Kraft, D-47167 Duisburg, Germany) are added. A dark blue-black coloured, aqueous mixture having no visible solids is obtained. This aqueous mixture is stirred under maintaining the streaming N$_2$-cover for 16 hours at 90° C. The solution is subsequently spray-dried in a spray-dryer (type Minor MM, Niro, Denmark)

under nitrogen (inlet temperature=330° C., outlet temperature=106° C.). The dark-grey spray-powder obtained therefrom shows an X-ray amorphous structure in the X-ray powder diffraction pattern.

50 g of the so-obtained spray-powder are heated during one hour to an end temperature T in a continuously rotating (7 rpm) 1-l-spherical quartz glass in a laboratory rotary furnace (BASF), held at this temperature T for one hour and is subsequently cooled under streaming $N_2$ to room temperature.

Example 2.1

The end temperature T of 600° C. gives a powder having a BET-surface area of 16.7 $m^2$/g and a X-ray powder diffraction pattern showing the monophasic structure of $Li_3Fe_2(PO_4)_3$, being isostructural with $Li_3V_2(PO_4)_3$. The powder shows a spherical habitus in scanning electron microscopy having an average spherical size of about 30 μm. The surface of the sphericals shows small porous channels going into the interior of the sphericals.

Example 2.2

End temperature T of 700° C. gives a powder having a BET-surface area of 13.2 $m^2$/g and a X-ray powder diffraction pattern showing the monophasic structure of $Li_3Fe_2(PO_4)_3$, being isostructural with $Li_3V_2(PO_4)_3$. The powder shows a spherical habitus in scanning electron microscopy having an average spherical size of about 30 μm. The surface of the sphericals shows small porous channels going into the interior of the sphericals.

Example 3

$Li_3V_2(PO_4)_3$ from LiOAc, $NH_4VO_3$, $N_2H_4$*$H_2O$, $H_3PO_3$, $H_3PO_4$, $NH_3$
formal:

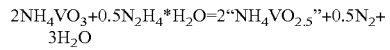

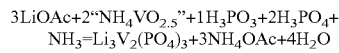

In a 10 l-glass-reactor which is heatable from the outside, 6 l water are placed at 80° C. under streaming N2 (50 NL/h). The streaming N2-cover is maintained during the further process. Under stirring 415.74 g LiCH3COO (99%, 6.3 mol Li, Chempur, D-76204 Karlsruhe, Germany) are added and dissolved to give a clear, colourless solution. 468.15 g NH4VO3 (99.95%, 4 mol V, H.C. Starck, D-38615-Gosslar, Germany) are dissolved in this solution to give a clear, lightly yellow aqueous solution. 55.07 g N2H4*H2O (99.95%, 1.1 mol N2H4, Merck, D-64295 Darmstadt, Germany) are added to this solution during 15 minutes. Thereupon 167.34 g H3PO3 (98%, 2 mol P, Acros Organics, B-2440 Geel, Belgium) are added to this solution during 0.5 minutes. 461.16 g H3PO4 (85%, 4 Mol P, Fa. Riedel-de-Haen, D-30926 Seelze, Germany) and 136.0 g of an aqueous NH3-solution (25%, 2.0 mol $NH_3$, Bernd Kraft, D-47167 Duisburg, Germany) are added. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray powder obtained therefrom shows an amorphous structure in the X-ray powder diffraction pattern.

50 g of the obtained spray powder are subsequently added to a continuously rotating (7 rpm) 1 l-crystal ball under streaming nitrogen (15 NL/h) in a laboratory rotary furnace (BASF) and heated in one hour to an end temperature T, is hold at this temperature T for one hour and is subsequently cooled to room temperature under streaming $N_2$.

The end temperature T of 700° C. gives rise to a powder having a BET-surface of 13.4 $m^2$/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 μm.

Example 4

$Li_3V_2(PO_4)_3$ from LiOAc, $NH_4VO_3$, $C_6H_{12}O_6$ (glucose), $H_3PO_3$, $H_3PO_4$, $NH_3$
formal:

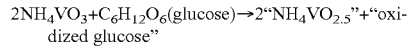

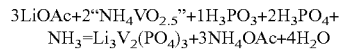

In a 10 l-glass-reactor which is heatable from the outside, 6 l water are placed at 80° C. under streaming $N_2$ (50 NL/h). The streaming $N_2$-cover is maintained during the further process. Under stirring 415.74 g LiCH3COO (99%, 6.3 mol Li, Chempur, D-76204 Karlsruhe, Germany) are added and dissolved to give a clear, colourless solution. 468.15 g NH4VO3 (99.95%, 4 mol V, H.C. Starck, D-38615-Gosslar, Germany) are dissolved in this solution to give a clear, lightly yellow aqueous solution. 217.99 g $C_6H_{12}O_6$ (Glucose, 99.9%, 1.1 mol $C_6H_{12}O_6$, Carl Roth GmbH & Co., 76185 Karlsruhe, Germany) are added to this solution during 15 minutes. Thereupon 167.34 g $H_3PO_3$ (98%, 2 mol P, Acros Organics, B-2440 Geel, Belgium) are added to this solution during 0.5 minutes. 461.16 g $H_3PO_4$ (85%, 4 Mol P, Fa. Riedel-de-Haen, D-30926 Seelze, Germany) and 136.0 g of an aqueous $NH_3$-solution (25%, 2.0 mol $NH_3$, Bernd Kraft, D-47167 Duisburg, Germany) are added. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray powder obtained therefrom shows an amorphous structure in the XRD-powder diagram.

50 g of the obtained spray powder are subsequently added to a continuously rotating (7 rpm) 1 l-crystal ball under streaming nitrogen (15 NL/h) in a laboratory rotary furnace (BASF) and heated in one hour to an end temperature T, is hold at this temperature T for one hour and is subsequently cooled to room temperature under streaming $N_2$.

The end temperature T of 700° C. gives rise to a powder having a BET-surface of 13.8 $m^2$/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 μm.

Example 5

Li$_3$V$_2$(PO$_4$)$_3$ from LiOH*H$_2$O, LiCH$_3$COO, NH$_4$VO$_3$, H$_3$PO$_3$ LiOH*H$_2$O+2LiOAc+2NH$_4$VO$_3$+3H$_3$PO$_3$→Li$_3$V$_2$(PO$_4$)$_3$+2NH$_4$OAc A possible reaction pathway could be:

LiOH*H$_2$O+2LiOAc+2NH$_4$VO$_3$+3H$_3$PO$_3$=Li$_3$V$_2$(PO$_4$)$_3$+2NH$_4$OAc+5H$_2$O+H$_2$ 6 l water are placed in a 10-l-glass reactor which is heatable from the outside at 85° C. under streaming N$_2$ (50 NL/h). The streaming N$_2$-cover is maintained during the further reaction. Under stirring 87.48 g LiOH*H$_2$O (57.49% per weight LiOH, 2.1 mol Li, Chemetall GmbH, D-60487 Frankfurt, Germany) and 279.92 g LiCH$_3$COO (99%, 4.2 mol Li, Chempur, D-76204 Karlsruhe, Germany) are dissolved in these 6 l water which are heated to 85° C. to give a clear solution. 468.15 g NH$_4$VO$_3$ (99.95%, 4 mol V, H.C. Starck, D-38615-Gosslar, Germany) are dissolved in this solution to give a clear, lightly yellow aqueous solution. 502.04 g H$_3$PO$_3$ (98%, 6 mol P, Acros Organics, B-2440 Geel, Belgium) are dissolved therein. A dark green-black coloured, aqueous mixture having no visible solids is obtained. This aqueous mixture is stirred under maintaining the streaming N$_2$-cover for 4 hours at 90° C. The solution is subsequently spray-dried in a spray-dryer (type Minor MM, Niro, Denmark) under nitrogen (inlet temperature=330° C., outlet temperature=106° C.).

50 g of the so-obtained spray powder are heated during one hour to an end temperature T in a continuously rotating (7 rpm) 1-l-spherical quartz glass in a laboratory rotary furnace (BASF), held at this temperature T for one hour and is subsequently cooled under streaming N$_2$ to room temperature.

Example 5.1

The end temperature T of 500° C. gives a powder having a BET-surface area of 6.0 m$^2$/g and a X-ray powder diffraction pattern showing the X-ray amorphous structure as shown in FIG. 1. The powder shows a spherical habitus in scanning electron microscopy (SEM) having an average spherical size of about 30 µm. The surface of the sphericals shows small porous channels going into the interior of the sphericals.

Example 5.2

The end temperature T of 600° C. gives a powder having a BET-surface area of 4.0 m$^2$/g and a X-ray powder diffraction pattern showing the monophasic structure of Li$_3$Fe$_2$(PO$_4$)$_3$, being isostructural with Li$_3$V$_2$(PO$_4$)$_3$. The powder shows a spherical habitus in scanning electron microscopy (SEM) having an average spherical size of about 30 µm. The surface of the sphericals shows small porous channels going into the interior of the sphericals.

Example 5.3

End temperature T of 700° C. gives a powder having a BET-surface area of 1.0 m$^2$/g and a X-ray powder diffraction pattern showing the monophasic structure of Li$_3$Fe$_2$(PO$_4$)$_3$, being isostructural with Li$_3$V$_2$(PO$_4$)$_3$. The powder shows a spherical habitus in scanning electron microscopy having an average spherical size of about 30 µm. The surface of the sphericals shows small porous channels going into the interior of the sphericals (like FIG. 3).

Example 5.4

End temperature T of 750° C. gives a powder having a BET-surface area of 0.5 m$^2$/g and a X-ray powder diffraction pattern showing the monophasic structure of Li$_3$Fe$_2$(PO$_4$)$_3$, being isostructural with Li$_3$V$_2$(PO$_4$)$_3$. The powder shows a spherical habitus in scanning electron microscopy having an average spherical size of about 30 µm. The surface of the sphericals shows small porous channels going into the interior of the sphericals (like FIG. 3).

The invention claimed is:

1. A process for the preparation of a mixture comprising at least one compound according to general formula (I)

$$Li_{a-b}M^1_bV_{2-c}M^2_c(PO_4)_x \qquad (I)$$

wherein M$^1$, M$^2$, a, b, c and x have the following meanings:
M$^1$: Na, K, Rb and/or Cs,
M$^2$: Ti, Zr, Nb, Cr, Mn, Fe, Co, Ni, Al, Mg and/or Sc,
a: 1.5-4.5,
b: 0-0.6,
c: 0-1.98 and
x: number to equalize the charge of Li and V and M$^1$ and/or M$^2$, if present,
wherein a-b is >0,
and at least one electrically conducting material, said process comprising
(D) providing an essentially aqueous mixture comprising at least one electrically conducting material, and as substrates at least one lithium-containing compound, at least one vanadium-containing compound in which vanadium has the oxidation state +5 and/or +4, and at least one M$^1$-containing compound, if present, and/or at least one M$^2$-containing compound, if present, at least one reducing agent which is oxidized to at least one compound comprising at least one phosphorous atom in oxidation state +5 and optionally at least one compound being able to generate at least one gaseous compound and/or at least one precursor of a gaseous compound,
(E) drying the mixture provided in (D), in order to obtain a solid compound and
(F) calcining the solid compound obtained from (E) at a temperature of 300 to 950° C.,
wherein at least one of the substrates generates at least one gaseous compound and/or at least one precursor of a gaseous compound and the at least one gaseous compound and/or the gaseous compound generated from the at least one precursor of a gaseous compound is liberated in (E) and/or (F).

2. The process according to claim 1, wherein the essentially aqueous solution which is provided in (D) additionally comprises at least one compound comprising at least one phosphorous atom in oxidation state +5.

3. The process according to claim 1, wherein the at least one reducing agent which is oxidized to at least one compound comprising at least one phosphorous atom in oxidation state +5 is selected from the group consisting of H$_3$PO$_3$, (NH$_4$)H$_2$PO$_3$, (NH$_4$)$_2$HPO$_3$, (NH$_4$)$_3$PO$_3$, H$_3$PO$_2$, (NH$_4$)H$_2$PO$_2$, (NH$_4$)$_2$HPO$_2$, (NH$_4$)$_3$PO$_2$ and mixtures thereof.

4. The process according to claim 1, wherein the compound which is able to generate at least one gaseous compound is present and is selected from the group consisting of NH$_3$, NH$_4$-salts and mixtures thereof.

5. The process according to claim 4, wherein an $NH_4$-salt is present and is selected from the group consisting of $NH_4NO_3$, $NH_4NO_2$, $NH_4Cl$, $NH_4OAc$, $NH_4$-formate and mixtures thereof.

6. The process according to claim 2, wherein the at least one compound comprising at least one phosphorous atom in oxidation state +5 which is added in (A) is selected from the group consisting of $H_3PO_4$, $(NH_4)H_2PO_4$, $(NH_4)_2HPO_4$, $(NH_4)_3PO_4$ and mixtures thereof.

7. The process according to claim 1, wherein the compound of formula (I) is $Li_3V_2(PO_4)_3$.

8. The process according to claim 1, wherein $M^1$ is present in an amount of up to 10 mol %, in respect of the sum of Li and $M^1$.

9. The process according to claim 1, wherein $M^2$ is present in an amount of up to 50 mol %, in respect of the sum of V and $M^2$ present in the compound.

10. The process according to claim 1, wherein the lithium-containing compound is selected from the group consisting of LiOH, $LiOH*H_2O$, LiOAc, $Li_2CO_3$, $LiNO_3$ and mixtures thereof.

11. The process according to claim 1, wherein the lithium-containing compound is LiOAc or a combination of LiOAc and $LiOH*H_2O$.

12. The process according to claim 1, wherein the vanadium-containing compound has an oxidation state +5 and is selected from the group consisting of $V_2O_5$, $NH_4VO_3$, ammonium-polyvanadate and mixtures thereof, wherein ammonium-polyvanadate is a vanadium(V)-oxide, comprising ammonium-cations in an amount of about 5% by weight.

13. The process according to claim 1, wherein the vanadium-containing compound has an oxidation state +4 and is selected from the group consisting of $VOSO_4.x\,H_2O$, $VO_2$ and mixture thereof, wherein x in $VOSO_4.x\,H_2O$ depends on the drying state of the compound $VOSO_4$.

14. The process according to claim 1, wherein the vanadium-containing compound $NH_4VO_3$.

15. The process according to claim 1, wherein (A) is carried out at a temperature of 70 to 95° C.

16. The process according to claim 1, wherein after (B), the solid compound is in the form of spherical particles having a diameter of 3 to 200 μm.

17. The process according to claim 16, wherein the diameter is 8 to 50 μm.

18. The process according to claim 1, wherein the product obtained from (C) consist essentially of spherical agglomerates and/or particles having an average diameter of 3 to 200 μm.

19. The process according to claim 18, wherein the diameter is 8 to 50 μm.

20. The process according to claim 1, wherein the electrically conducting material is selected from the group consisting of carbon black, graphite, carbon fibres, carbon nanofibres, carbon nanotubes, electrically conducting polymers and mixtures thereof.

* * * * *